(12) United States Patent
Drew

(10) Patent No.: US 7,970,785 B2
(45) Date of Patent: **\*Jun. 28, 2011**

(54) METHOD AND COMPUTER PROGRAM PRODUCT FOR USING DATA MINING TOOLS TO AUTOMATICALLY COMPARE AN INVESTIGATED UNIT AND A BENCHMARK UNIT

(75) Inventor: James Howard Drew, Pepperell, MA (US)

(73) Assignee: Verizon Services Corp., Ashburn, VA (US)

( * ) Notice: Subject to any disclaimer, the term of this patent is extended or adjusted under 35 U.S.C. 154(b) by 428 days.

This patent is subject to a terminal disclaimer.

(21) Appl. No.: 12/251,750

(22) Filed: Oct. 15, 2008

(65) Prior Publication Data
US 2009/0112917 A1    Apr. 30, 2009

Related U.S. Application Data

(63) Continuation of application No. 11/293,242, filed on Dec. 5, 2005, now Pat. No. 7,493,324.

(51) Int. Cl.
*G06F 17/30* (2006.01)
(52) U.S. Cl. .................................................. 707/776
(58) Field of Classification Search .................. None
See application file for complete search history.

(56) References Cited

U.S. PATENT DOCUMENTS

| | | | | |
|---|---|---|---|---|
| 5,750,994 | A * | 5/1998 | Schlager | 250/339.11 |
| 5,809,499 | A * | 9/1998 | Wong et al. | 706/45 |
| 6,292,797 | B1 * | 9/2001 | Tuzhilin et al. | 707/999.003 |
| 6,640,204 | B2 * | 10/2003 | Feldman | 702/189 |
| 6,684,208 | B2 * | 1/2004 | Kil et al. | 707/723 |
| 7,181,370 | B2 * | 2/2007 | Furem et al. | 702/188 |
| 7,191,106 | B2 * | 3/2007 | Minor et al. | 703/2 |
| 7,243,100 | B2 * | 7/2007 | Ma et al. | 707/999.006 |
| 7,451,065 | B2 * | 11/2008 | Pednault et al. | 703/2 |
| 7,493,324 | B1 * | 2/2009 | Drew | 1/1 |
| 2004/0083452 | A1 * | 4/2004 | Minor et al. | 717/109 |
| 2007/0038386 | A1 * | 2/2007 | Schadt et al. | 702/20 |
| 2007/0185656 | A1 * | 8/2007 | Schadt | 702/19 |

OTHER PUBLICATIONS

Jingfang Xu et al., Estimating Collection Size with Logistic Regression, Jul. 2007, SIGIR ACM, pp. 789-790.*
Victor S.Y. Lo, The thrue lift model: a novel data mining approach to response modeling in database marketing, Dec. 2002, ACM, vol. 4, Issue 2, pp. 78-86.*
Siddharta Bhattacharyya,Evolution Algorithms in Data Mining: Multi-Objective Performance Modeling for Direct Marketing, Year 2000, ACM, pp. 465-473.*
Zhang et al., Surrogate Maximization/Minimization Alogorithms for AdaBoost and Logistic Regression Model, Year 2004, ACM International Conference Proceding Series, vol. 69, pp. 1-8.*

* cited by examiner

*Primary Examiner* — Neveen Abel-Jalil
*Assistant Examiner* — Jacques Veillard

(57) ABSTRACT

Sources of operational problems in business transactions often show themselves in relatively small pockets of data, which are called trouble hot spots. Identifying these hot spots from internal company transaction data is generally a fundamental step in the problem's resolution, but this analysis process is greatly complicated by huge numbers of transactions and large numbers of transaction variables to analyze. A suite of practical modifications are provided to data mining techniques and logistic regressions to tailor them for finding trouble hot spots. This approach thus allows the use of efficient automated data mining tools to quickly screen large numbers of candidate variables for their ability to characterize hot spots. One application is the screening of variables which distinguish a suspected hot spot from a reference set.

17 Claims, 7 Drawing Sheets

| Repair Time by Hour k:<br>k = | Estimate<br>(β) | t-value<br>(β/Std. Error) |
|---|---|---|
| 0 | 0.22 | 0.31 |
| 1 | -0.4 | -0.36 |
| 2 | -3.5 | -1.95 |
| 3 | -1.77 | -1.23 |
| 4 | -2.23 | -1.55 |
| 5 | 0.88 | 0.84 |
| 6 | 0.95 | 1.67 |
| <u>7</u> | <u>0.81</u> | <u>2.9</u> |
| <u>8</u> | <u>1.06</u> | <u>7.08</u> |
| <u>9</u> | <u>0.97</u> | <u>8.08</u> |
| <u>10</u> | <u>1.01</u> | <u>8.77</u> |
| <u>11</u> | <u>0.69</u> | <u>6.11</u> |
| <u>12</u> | <u>0.67</u> | <u>5.62</u> |
| 13 | 0.19 | 1.62 |
| 14 | -0.21 | -1.67 |
| 15 | -0.17 | -1.39 |
| 16 | -0.26 | -2 |
| 17 | -0.07 | -0.52 |
| 18 | 0.16 | 1.01 |
| 19 | -0.31 | -1.56 |
| 20 | 0.11 | 0.51 |
| 21 | 0.06 | 0.25 |
| 22 | 0.63 | 1.9 |

FIG. 5

METHOD AND COMPUTER PROGRAM PRODUCT FOR USING DATA MINING TOOLS TO AUTOMATICALLY COMPARE AN INVESTIGATED UNIT AND A BENCHMARK UNIT

RELATED APPLICATIONS AND PRIORITY CLAIM

This is a Continuation of prior application Ser. No. 11/293,242, filed Dec. 5, 2005 now U.S. Pat. No. 7,493,324, entitled, "Method and Computer Program Product for Using Data Mining Tools to Automatically Compare an Investigated Unit and a Benchmark Unit,", to which priority under 35 U.S.C. §120 is claimed. The entire contents of the aforementioned application are herein expressly incorporated by reference.

BACKGROUND INFORMATION

The sources of operational problems in business transactions often show themselves in relatively small pockets of data, which are called trouble hot spots. Identifying these hot spots from internal company transaction data is generally a fundamental step in the problem's resolution, but this analysis process is greatly complicated by huge numbers of transactions and large numbers of transaction variables that must be analyzed.

Basically, a "hot spot" among a set of comparable observations is one generated by a different statistical model than the others. That is, most of the observations come from one default statistical model, while a relative few come from one or more different models. In its classic usage, a "hot spot" is a geographic location where an environmental condition, such as background radiation levels or disease incidence, is higher than surrounding locations. The central idea of a "hot spot" is its statistical comparison with a reference entity: there must be a set of observations from a default model from which the "hot spots" distinguish themselves.

There are many diverse applications for this concept: (1) a network, such as the DSL or fast packet network, includes many pieces of equipment (e.g., DSLAMs or frame relay switches) and some of these tend to be more trouble-prone than the rest; (2) a business process, such as the testing of circuit troubles, may have geographic locations, times of day, or specific employees which are associated with higher diagnosis or repair times than the rest; (3) an employee function, such as trouble ticket handling, may have some technicians who are more or less productive than their peers; and (4) certain transactions, such as customer care calls or trouble repairs, may be more time-consuming than others, for example.

There are common threads in these applications. First, as stated above, there are moderately to very large sets of "normal" entities (e.g., switches, line testings, employees) to estimate the parameters of the background model from which the "hot spots" distinguish themselves. Second, the distinguishing is structural, and not due to chance alone. That is, the equipment/testing procedure/employee handling is abnormal or bad, and not just a function of natural variations in the environment. Third, the pattern of "hot spots" persists over time, so that corrective measures have time to be formulated and implemented. Specific equipment/testing outcomes/employee productivity must remain as an issue long enough for corrective actions to make an improvement. Finally, the "hot spots" must be distinctive enough, or in a sufficiently crucial business so their repair makes a substantial contribution to the company's performance.

Once a "hot spot" is found, a fundamental part of its diagnosis lies in its comparison with entities that are not "hot." One might compare variables from a troublesome geographic location with those from other locations, or a troublesome serving hour with other times. There are at least two kinds of entities whose variables might be usefully compared with the "hot spot": 1) entities which are like the "hot spot" in geography, organization, technology, etc., or 2) entities which are high performers that may serve as "best in class" benchmarks or which have performance levels to which the "hot spot" may aspire. For conciseness, call this entity the "Reference" (R), to which the "Hot Spot" (H) will be compared. The goal is to understand "H-R" differences, i.e. how the Reference and the Hot Spot differ in terms of their descriptive variables X.

Usually, in business applications, the Reference is known (e.g., a well-performing business unit). The Hot Spot is also typically identified, either from prior knowledge, or by discovery through standard data mining techniques as mentioned above. The problem is that there may be many variables X to compare across the two entities, and many conditions under which to compare them. For instance, telephone repair times can be split into many constituent parts, and those parts should be compared for such conditions as time of day, day of week, type of trouble, etc. Data mining tools are designed to efficiently analyze large data sets with many variables, but they are typically designed to expose relationships within a single entity, not across two or more entities, such as two or more locations, as required to understand the H-R differences.

Instead, subjective opinion or informed guessing would be used to suggest ways in which the two (or more) locations might be expected to differ. Unfortunately, subjective opinion and informed guessing are not always accurate and may not take into account the myriad of potential comparison variables that may be necessary to consider in order to accurately identify hotspots.

BRIEF DESCRIPTION OF THE SEVERAL VIEWS OF THE DRAWING(S)

Reference will now be made to the accompanying drawings, which are not necessarily drawn to scale, and wherein:

FIG. 5 shows a table that lists the estimates of twenty-three interaction terms and their associated t-values in accordance with the example of FIGS. 3-4.

DETAILED DESCRIPTION OF PREFERRED EMBODIMENTS

Figure 1A:
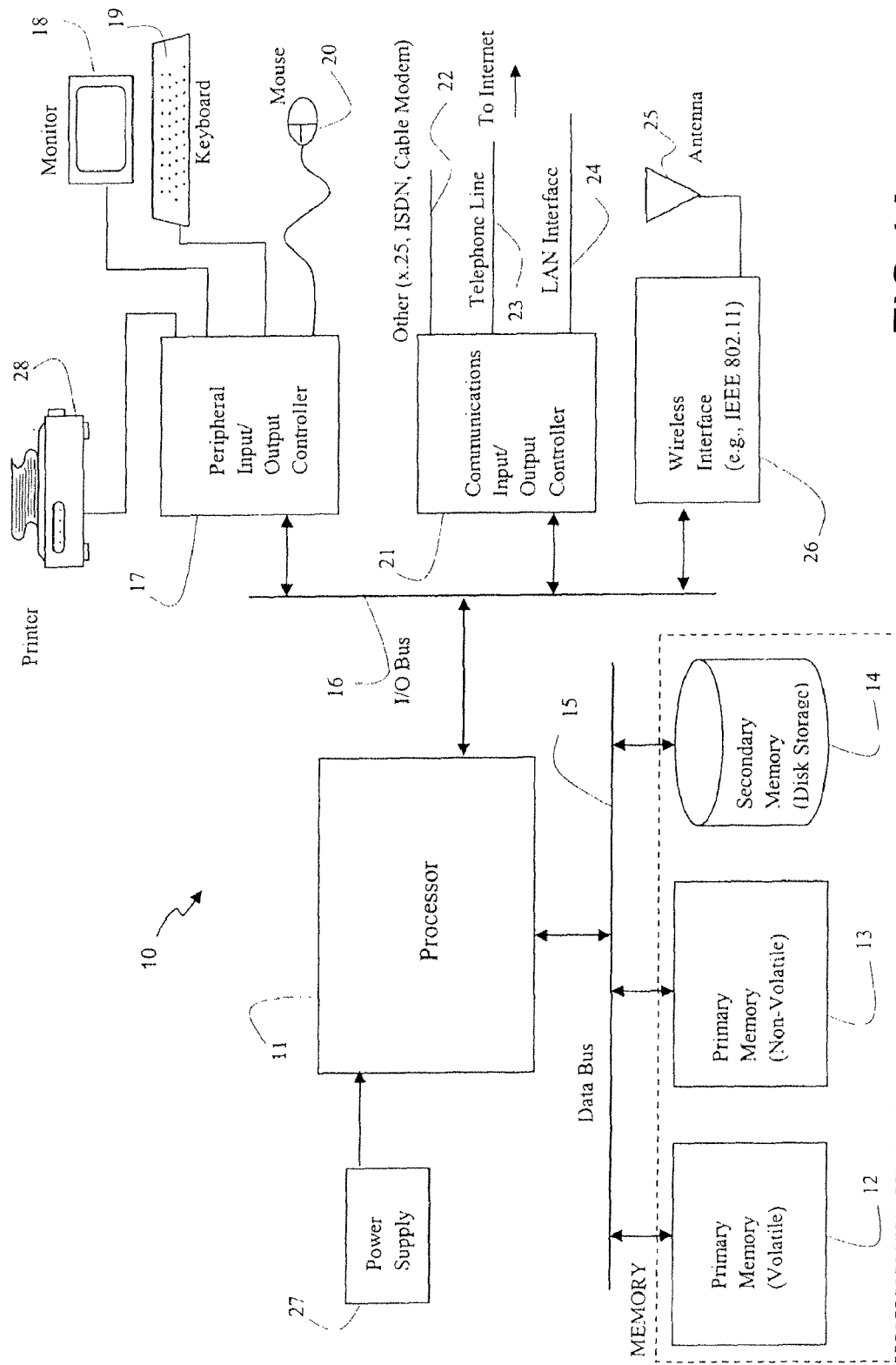
FIGS. 1A-1B show exemplary computer system architectures that may be used to implement embodiments of the present invention.

The preferred embodiments according to the present invention(s) now will be described more fully hereinafter with reference to the accompanying drawings, in which some, but not all embodiments of the invention(s) are shown. Indeed, the invention(s) may be embodied in many different forms and should not be construed as limited to the embodiments set forth herein; rather, these embodiments are provided so that this disclosure will satisfy applicable legal requirements. Like numbers refer to like elements throughout.

As indicated above, the identification of hot spots from internal company transaction data is generally a fundamental step in the resolution of operational problems in business transactions. However, this analysis process is greatly complicated by the need to analyze huge numbers of transactions and large numbers of transaction variables. According to embodiments of the present invention, data mining techniques, and logistic regressions in particular, are utilized to analyze the data and to find trouble hot spots. This approach thus allows the use of efficient automated data mining tools to quickly screen large numbers of candidate variables for their ability to characterize hot spots. One application that is described below is the screening of variables which distinguish a suspected hot spot from a reference set.

In order to permit an H-R difference to be analyzed with data mining tools, such as a logistic regression model, one method of embodiments of the invention initially transforms input data from both the H and R sources as described below. If the data is set up properly, then the H-R differences can be read as coefficients of a logistic regression model in which the dependent variable y (or target, in data mining terminology) is an indicator of an observation's membership in H or R. For observation i, that is, $$y_i = \begin{cases} 1, & \text{if } i \in H \\ 0, & \text{if } i \in R \end{cases}$$

For a matrix of variables $X=(X_1, X_2, \ldots X_K)$, whose differences are to be compared between H and R, the logistic regression model is $$P(y_i = 0 \mid X_i) = \frac{1}{1 + e^{\beta_0 + \beta X_i}} \quad \text{(III.1)}$$

where $X_i$ is the ith row of the matrix X, and therefore the values of the variables $(X_{1i}, X_{2i}, \ldots, X_{Ki})$ for the $i^{th}$ observation.

If the distribution of X conditional on $y=j$, $j=0,1$ is multivariate normal with mean $\mu_j$ and common covariance matrix $\Sigma$, then the logistic regression coefficients given in (III.1) are $$\beta = (\mu_1 - \mu_0)' \Sigma^{-1} \quad \text{(III.2)}$$

and $$\beta_0 = \ln\left(\frac{\theta_1}{\theta_0}\right) - .5(\mu_1 - \mu_0)' \Sigma^{-1} (\mu_1 - \mu_0)$$

where $\theta_j = P(y=j)$.

This can be proven by noting that since the conditional distribution of X, given $y=j$, is multivariate normal, $$P(X|y=j) = (\text{constant}) e^{-.5(\mu_1 - \mu_0)' \Sigma^{-1} (\mu_1 - \mu_0)} \quad \text{(III.3)}$$

Then $$P(y = 0 \mid X) = \frac{P(X \mid y = 0) P(y = 0)}{P(X \mid y = 0) P(y = 0) + P(X \mid y = 1) P(y = 1)}$$

$$= \frac{1}{1 + \frac{P(X \mid y = 1) P(y = 1)}{P(X \mid y = 0) P(y = 0)}}$$

which, by (III.1) also equals $$\frac{1}{1 + e^{\beta_0 + \beta X}}$$

The result follows from equating $e^{\beta_0 + \beta X}$ and $$\frac{P(X \mid y = 1) P(y = 1)}{P(X \mid y = 0) P(y = 0)},$$

using the definition of multivariate normality in (III.3)

Therefore, since the vector of coefficients β is a scaled version of the difference between respective variables, one method of embodiments of the present invention can effectively compare H and R by one determination of β.

Note that only $\beta_0$, and not β, depends on the proportion of H and R observations in the data under analysis. This is meaningful from a data mining perspective, as it implies that the proportions can be adjusted to balance the data between the two subsets as needed.

As demonstrated by equation (III.2), one method of embodiments of the present invention can quantify a comparison between the Reference and the Hot Spot as a logistic regression coefficient that is scaled by the covariance matrix of the set of variables under consideration. Logistic regression is a technique readily available in most data mining packages, such as SAS Enterprise Miner or SPSS Clementine.

To use any of these data mining packages to solve the problem of attribute comparison between H and R, some pre-processing may initially be performed. Note first that the logistic regression coefficients given in (III.2) are scaled by their covariance matrix. Because the components of this matrix are sensitive to outliers and skewness in their associated variables, it may be advantageous to trim outliers and transform the original variables to near symmetry (for which a log transformation is often appropriate). Conventional data mining software packages can perform the trimming of outliers and the transformation to near symmetry as will be recognized by those skilled in the art.

Note that when comparing variables whose (raw or transformed) variances may differ and whose values may be correlated, their values may be standardized to put their comparisons between H and R on an equal footing. Since this is exactly the scaling presumed by the logistic regression coefficient in III.2, this implies that a direct reading of the regression coefficients will produce lists of the most important variables on which H and R differ.

One other type of preprocessing may be helpful. Many databases have huge numbers of variables on which an H-R comparison could be done. Although a logistic regression analysis may be employed to estimate those H-R differences as described herein, a preliminary decision tree analysis (using the same dependent and independent variables as above)

may be performed initially to efficiently provide a gross screening of the variables. In practice, the variables identified by decision trees, and those selected by a stepwise logistic regression are quite similar, and the use of the former, in some embodiments, is recommended because of its computational speed. There are no particular kinds of variables rejected through a decision tree, but the procedure of performing a preliminary decision tree analysis can be used to indicate which variables have no discernable effect on the H-R comparison. Those variables passing the decision tree screening may then be analyzed via logistic regression in accordance with embodiments of the present invention as described above.

The foregoing analysis will identify those single variables whose standardized values differ most between the Hot Spot and the Reference group. In regards to an example in which the diagnosis time of different repair depots are being considered, the foregoing method may identify that repairs in Hot Spot location H have a higher mean diagnosis time than those in Reference location R. Similarly, the foregoing method may discover that the average number of repairs of a certain type is higher in location H than in location R.

The next step in the diagnosis of H-R differences then involves two or more variables. Considering one foregoing example, if mean repair times are different in locations H and R, then one would want to detect variations in those differences to see if those differences depend upon or bear a relationship to which, if any, variables. For example, does the repair time difference vary across hours of the day, or is it constant? In statistical terms, this inquiry is equivalent to determining if the key variable (repair time) interacts with another variable (hours of the day.) This type of inquiry is therefore addressed by the logistic regression estimation of interaction, or cross-product terms in the equation, in which the main effects of the second variable are also included. This is further equivalent to nesting the effects of the key variable in the second.

The above description will now be further illustrated by reference to the accompanying drawings. Referring to FIG. 1A, a computer system 10 may be used to implement embodiments of the present invention. In one embodiment, the computer system 10 includes a processor 11, such as a microprocessor, that can be used to access data and to execute software instructions for carrying out the defined steps. The processor 11 receives power from a power supply 27 that also provides power to the other components as necessary. The processor 11 communicates using a data bus 15 that is typically 16 or 32 bits wide (e.g., in parallel). The data bus 15 is used to convey data and program instructions, typically, between the processor and memory. In the present embodiment, memory can be considered primary memory 12 that is RAM or other forms which retain the contents only during operation, or it may be non-volatile 13, such as ROM, EPROM, EEPROM, FLASH, or other types of memory that retain the memory contents at all times. The memory could also be secondary memory 14, such as disk storage, that stores large amount of data. The secondary memory may be a floppy disk, hard disk, compact disk, DVD, or any other type of mass storage type known to those skilled in the computer arts.

The processor 11 may also communicate with various peripherals or external devices using an I/O bus 16. In the present embodiment, a peripheral I/O controller 17 is used to provide standard interfaces, such as RS-232, RS422, DIN, USB, or other interfaces as appropriate to interface various input/output devices. Typical input/output devices include local printers 28, a monitor 18, a keyboard 19, and a mouse 20 or other typical pointing devices (e.g., rollerball, trackpad, joystick, etc.). The processor 11 may also communicate using a communications I/O controller 21 with external communication networks, and may use a variety of interfaces such as data communication oriented protocols 22 such as X.25, ISDN, DSL, cable modems, etc. The communications controller 21 may also incorporate a modem (not shown) for interfacing and communicating with a standard telephone line 23. The communications I/O controller may further incorporate an Ethernet interface 24 for communicating over a LAN. Any of these interfaces may be used to access the Internet, intranets, LANs, or other data communication facilities. Finally, the processor 11 may communicate with a wireless interface 26 that is operatively connected to an antenna 25 for communicating wirelessly with other devices, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
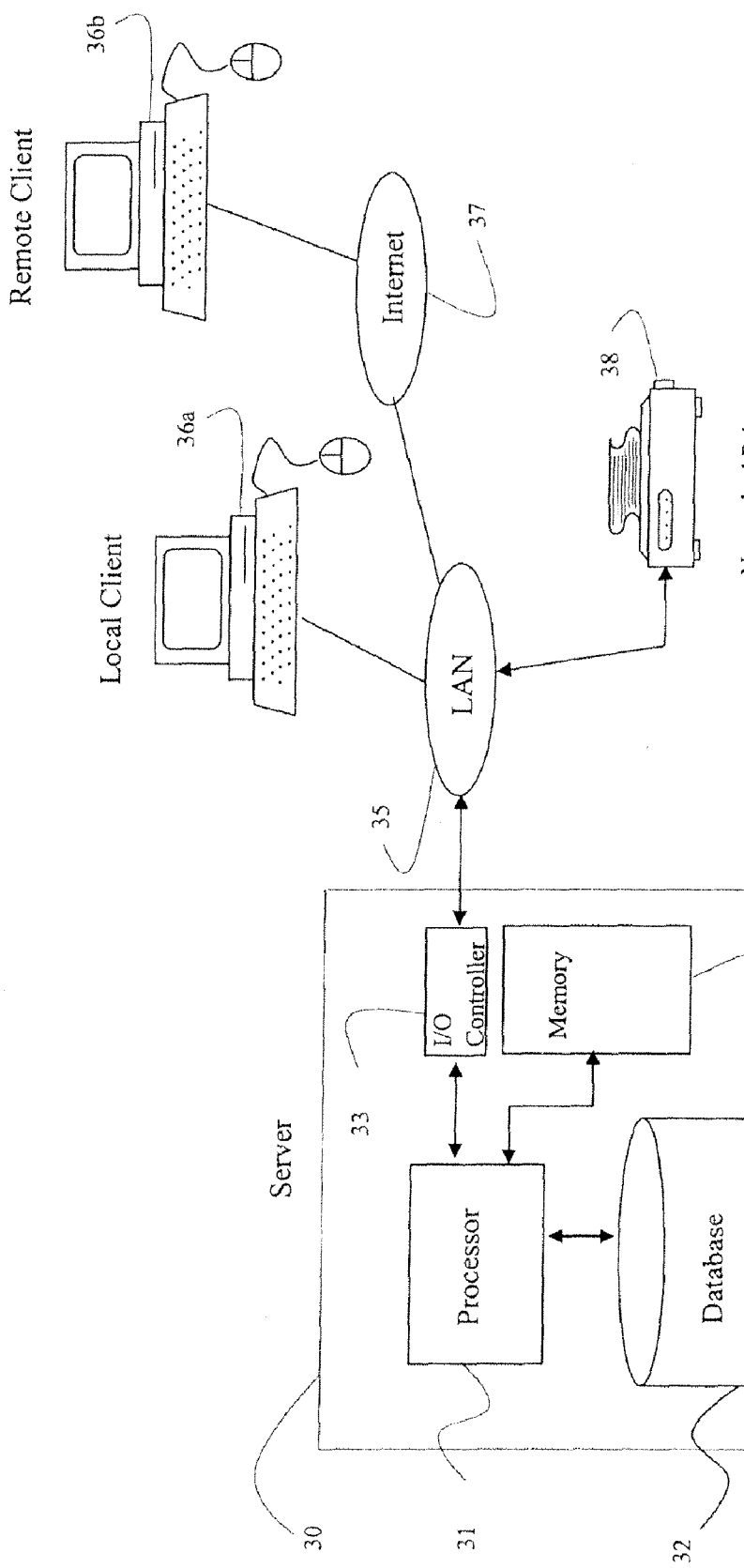

An alternative embodiment of a computer processing system that could be used is shown in FIG. 1B. In this embodiment, a distributed communication and processing architecture is shown involving a server 30 communicating with either a local client computer 36a or a remote client computer 36b. The server 30 typically comprises a processor 31 that communicates with a database 32, which can be viewed as a form of secondary memory, as well as primary memory 34. The processor also communicates with external devices using an I/O controller 33 that typically interfaces with a LAN 35. The LAN may provide local connectivity to a networked printer 38 and the local client computer 36a. These may be located in the same facility as the server, though not necessarily in the same room. Communication with remote devices typically is accomplished by routing data from the LAN 35 over a communications facility to the Internet 37. A remote client computer 36b may execute a web browser, so that the remote client 36b may interact with the server as required by transmitted data through the Internet 37, over the LAN 35, and to the server 30.

Those skilled in the art of data processing will realize that many other alternatives and architectures are possible and can be used to practice embodiments implemented according to the present invention. Thus, embodiments implemented according to the present invention are not limited to the particular computer system(s) 10 shown, but may be used on any electronic processing system having sufficient performance and characteristics (such as memory) to provide the functionality described herein. Any software used to implement embodiments of the present invention, which can be written in a high-level language such as C or Fortran, may be stored in one or more of the memory locations described above. The software should be capable of interfacing with any internal or external subroutines, such as components of a standard data mining software package used to perform logistic regression and other statistical techniques. Standard data mining software packages that can be used in connection with embodiments of the present invention may include, for example, the types of data mining software packages that are provided by SPSS Inc., SAS Inc., and other such software vendors.

Figure 2:
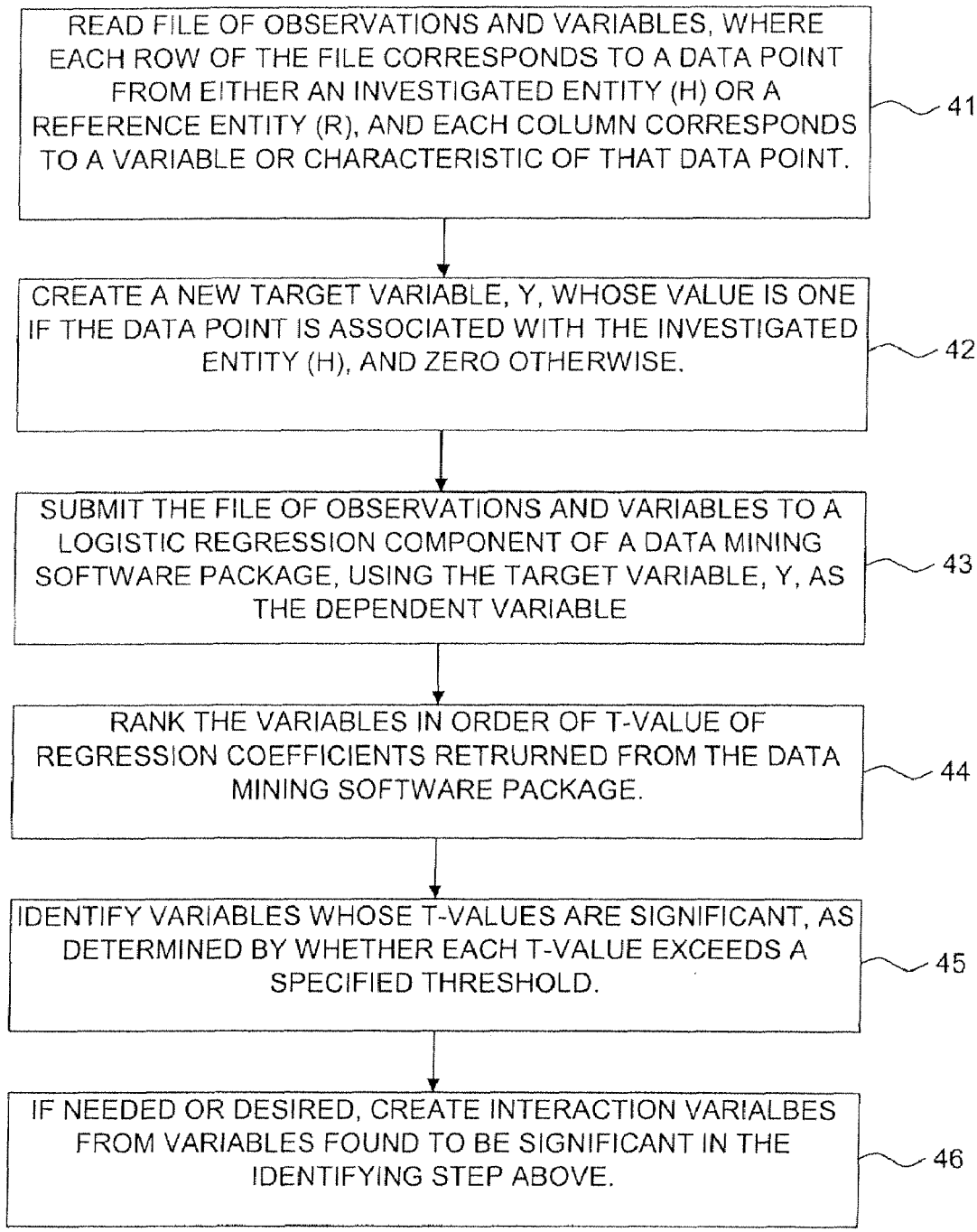
FIG. 2 shows a flowchart of an embodiment indicating how an investigated entity H can be compared to a reference entity R.

FIG. 2 shows a flowchart of an embodiment indicating how an investigated entity, H, can be compared to a reference entity, R, using the techniques described herein. In the first stage 41, a file of observations and variables (the independent variables X) is read by the processor 31 from memory, where each row of the file corresponds to one data point from either H or R, and each column corresponds to a variable or characteristic of that data point. In the second stage 42, a new target variable, Y, is created by the processor, whose value is one (or some other nonzero value) if the data point is associated with the investigated entity, H, and zero otherwise (i.e., zero if the data point is associated with the reference entity, R). In the third stage 43, the file of observations and variables is submitted by the processor 31 to a logistic regression component of a data mining software package, using the newly created target variable, Y, as the dependent variable which indicates whether each row of the file is associated with H or R.

As described above, some pre-processing of the data may be performed by the processor, in some embodiments, prior to carrying out the logistic regression described in stage 43. For example, if the number of variables, X, is very large (e.g., 1000+), the pre-processing may include submitting the file of data points to a decision tree component of the data mining software package (using the same independent variables, X, and dependent or target variable, Y, as above), as known to those skilled in the art, in order to trim outliers and transform the variables (typically with a log transformation) to near symmetry. Those variables passing the decision tree screening might then be used in the logistic regression of stage 43.

In stage 44, the independent variables, X, are ranked in order of "t-value" of regression coefficients returned from the logistic regression component of the data mining software package. As known to those skilled in the art, a t-value is a standard measure of the statistical significance of a statistic, such as the coefficient of a logistic regression. "Statistical significance," in turn, is defined herein as a very low probability (typically less that 5%) that the statistic would have assumed the value—i.e. its distance from zero—observed in the data by chance alone. Intuitively, this means that although a large value of the statistic could have been produced when its mean is actually zero, the chances of this actually happening are very small, no more than 5% by convention. As is also known to those skilled in the art, in terms of formulas, standard statistical and data mining packages calculate both estimates for a regression coefficient and for its standard error (which is a standard measure of its variability). In this case, the "t-value" of a given regression coefficient is just the estimate of the regression coefficient divided by the estimate of the coefficient's standard error.

At stage 45, the processor identifies variables whose respective t-values are significant by, for example, determining which variables have corresponding t-values that exceed a specified threshold. More specifically, the significance of t-values can be determined by comparing them to corresponding values found in standard look-up tables, or by comparing them to "p-values" provided as part of the output of the standard data mining software package, for example. As known to those skilled in the art, the p-value of a statistic is the probability that a statistic of that size (again, distance from zero) could have been produced when the underlying statistical process actually has a mean of zero. Note, in statistics, whenever one observes some statistic, such as an average or a regression coefficient, it is understood to have been produced by a statistical process with fixed, but unknown, parameters such as its mean. That's why it is possible for a process with a mean of zero to produce a statistic whose observed value is different from zero. Of course, the bigger the statistic observed, the smaller the probability that it could have been produced by a process whose actual mean was zero.

According to one embodiment, a statistic is "significant," or "significantly different from zero" when the p-value calculated by the data mining software package is less than 5%. As known to those skilled in the art, according to a well-established relationship, the larger the t-value, the smaller the p-value. The exact t-value which achieves significance depends somewhat on the number of observations on which the statistic is based, but for the very large sample sizes which are most common in data mining applications, the threshold value is 1.96. Thus, a t-value larger than 1.96 (or smaller than −1.96) indicates a "significant" variable.

If needed or desired, interaction variables can be created, at stage 46, from variables found to be significant in the identifying step above. In this regard, interaction variables are generally defined by the interaction of two other variables, such as by taking the cross product of two other variables, and provide information about the relationship of the two other variables. An exemplary implementation of this regression routine will now be outlined for a particular embodiment of the present invention.

Consider two business locations, H and R, which repair customer-reported trouble in a local telephone network. The location H is under investigation for its recent problematic performance, in the opinion of upper management. In contrast, location R, a contiguous area in the same business division has performed well in recent months. Many variables are readily available from corporate databases on which these two locations can be compared. As described above, a logistic regression with many of these variables included can be run with a standard data mining package. In that regression, the dependent variable is $$y_i = \begin{cases} 1, & \text{if } i \in H \\ 0, & \text{if } i \in R \end{cases} \quad (V.1)$$

and each of the many independent variables is denoted by $$X_i \quad (V.2)$$

Figure 3:
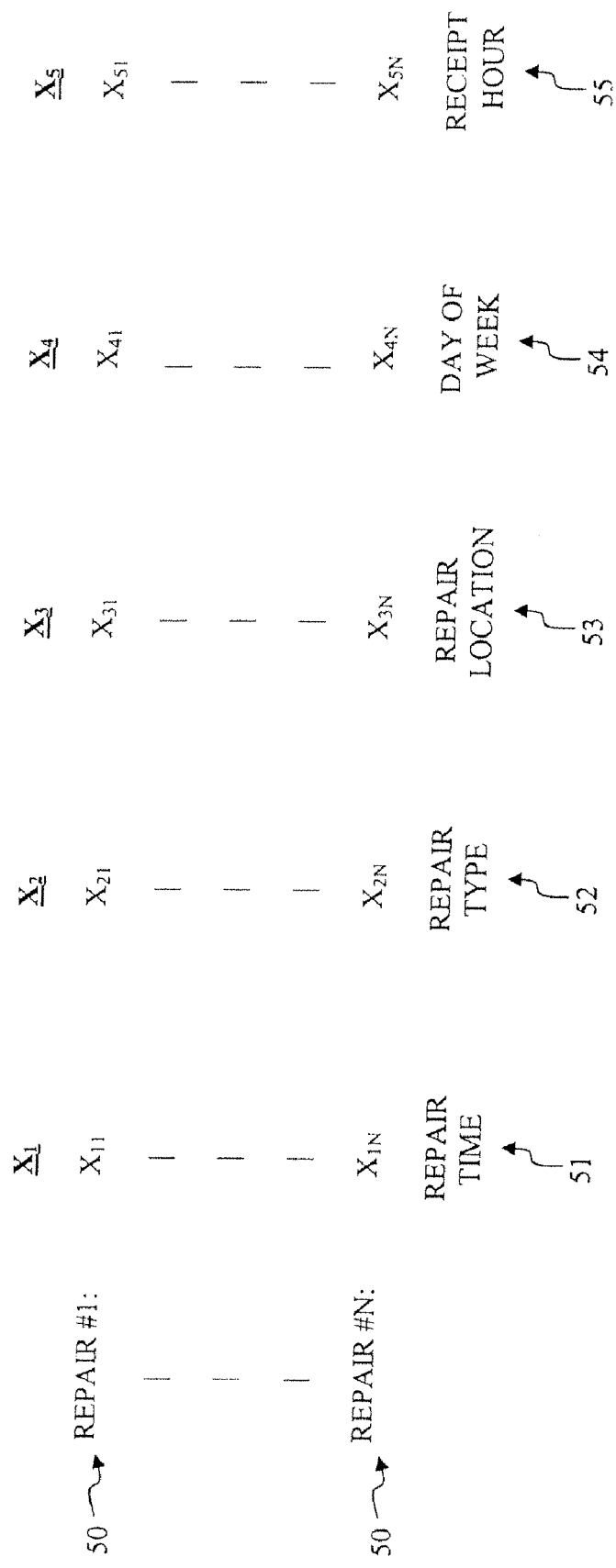
FIG. 3 shows a list of variables or characteristics for N observations of repair events, each of which has occurred at either an investigated location H or a reference location R.

FIG. 3 shows a list of variables (or characteristics) for N observations of repair events 50, each of which has occurred at either the investigated location H or the reference location R. Five types of variables are shown, although this number may vary in other embodiments. Accordingly, in this embodiment, the matrix of variables, $X=(X_1, X_2, \ldots, X_K)$, whose differences are to be compared between H and R has five vectors, $X_1, X_2, X_3, X_4$, and $X_5$ which are of length N. Specifically, the five variables or characteristics shown in this exemplary embodiment are Repair Time 51, Repair Type 52, Repair Location 53, Day of the Week 54, and Receipt Hour 55.

Figure 4:
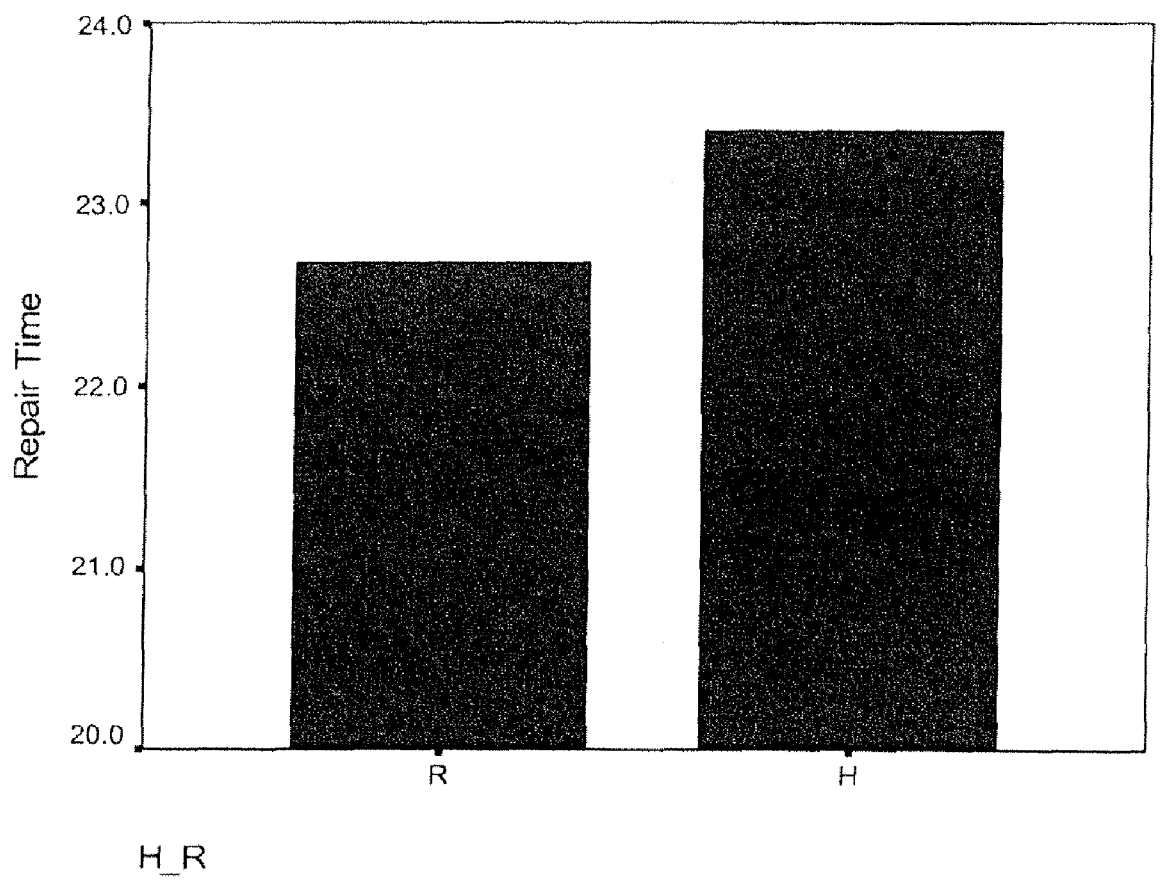
FIG. 4 shows an exemplary comparison of repair times for the two business locations, H and R, which repair customer-reported trouble in a local telephone network.

Now suppose the regression above identified the particular definition of Repair Time 51 as the largest single difference between locations H and R as a result of the t-value of the coefficient for Repair Time being 11.595, well above the usual 1.96 critical level, for example. FIG. 4 shows the higher repair times for location H. Note that even though the absolute difference in repair times between the two locations is not large, the regression identifies it as significant as a result of the t-value of the coefficient for Repair Time being 11.595, well above the usual 1.96 critical level. This may be consistent with management intuition, where this difference is important as it is close to an important 24-hour benchmark. In this case, the first-order comparison of H and R may not be surprising: regular performance measures have indicated that repair durations are generally longer in location H, the putative "hot spot." The issue then becomes identification of the conditions under which H's repair times are longer.

To demonstrate the analysis that would screen characteristics, consider the effect that the hour of trouble report receipt (i.e., Receipt Hour 55) has on this exemplary H-R comparison. In this regard, the automated analysis that would uncover Repair Time differences in Receipt Hour would be a logistic regression analysis. The dependent variable is $$y_i = \begin{cases} 1, & \text{if } i \in H \\ 0, & \text{if } i \in R \end{cases} \quad (V.3)$$

and the independent variables are $$X_{ki} = \begin{cases} 1, & \text{if } i \in H, \ k = \text{Receipt Hour } k \\ 0, & \text{otherwise} \end{cases} \quad (V.4)$$

and $$Z_{ki} = X_{ki} T_i \quad (V.5)$$

where $T_i$ is the Repair Time associated with the $i^{th}$ observation.

Note that these variables can be created in a standard data mining software package: (V.4) is simply an indicator variable automatically created when Receipt Hour is designated as a nominal variable, and (V.5) is simply the interaction, or cross-product, between Receipt Hour and Repair Time. For comparison of Repair Times across Receipt Hours, the interaction terms (V.5) should be considered.

FIG. 5 shows a table that lists the estimates (β) of the 23 interaction terms (one is set to zero by convention) and their associated t-values, which indicate the statistical significance of each such estimate. As would be readily understood by one of ordinary skill in the art, a t-value is the estimate divided by the standard error of the estimate, which, aside from β, is typically one of the standard outputs provided by the data mining software performing the logistic regression. (In these data, the sample sizes are very large, so a t-value greater than 1.96 is considered to be significant at the 95% level.)

Observe that the morning hours of 7 to 12 AM have significantly longer repair times than do the other hours of the day, as seen from the t-values that are underlined. (Recall that the coefficients themselves are standardized and have little direct meaning.) Incidentally, this finding may have an important business interpretation: troubles reported in the mornings take longer for location H to process because their work force has already been overwhelmed by the preceding day's trouble.

Figure 6:
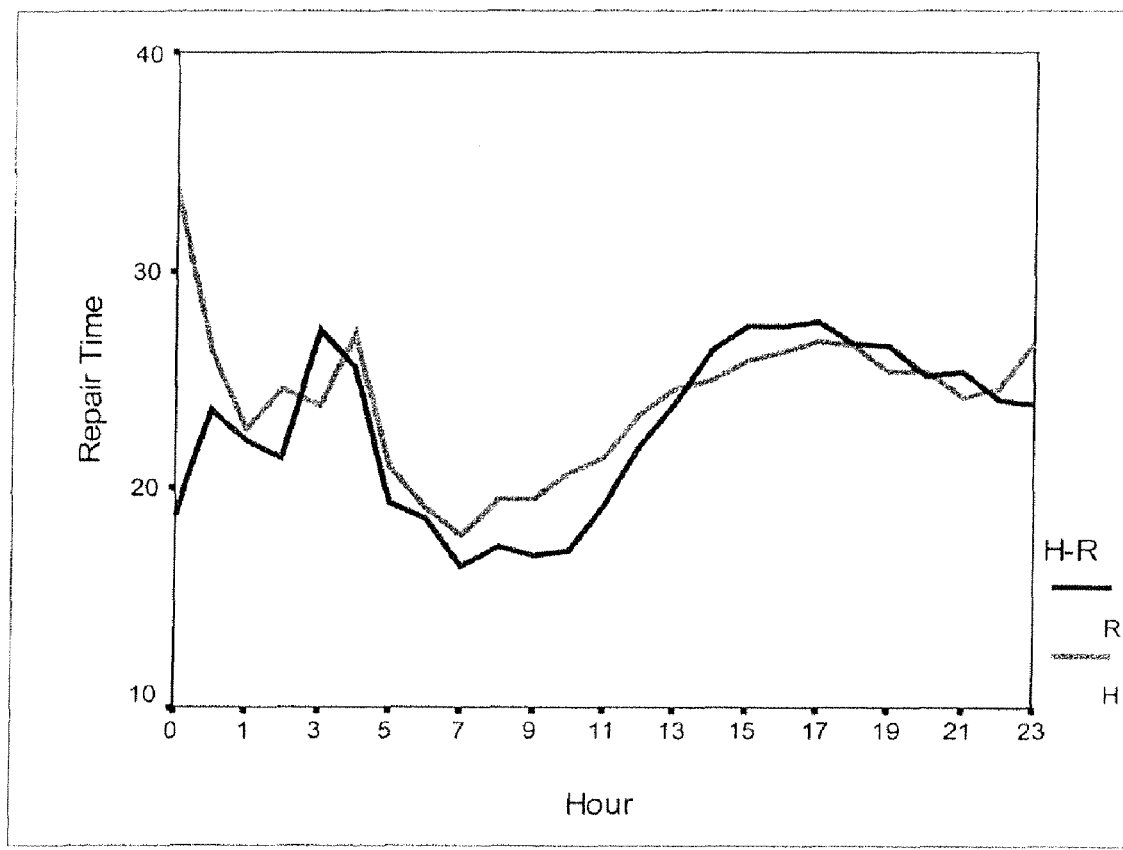
FIG. 6 shows a graph of the mean repair times of troubles reported to locations H and R during the hours of the day in accordance with the example of FIGS. 3-4.

This demonstration of the method was selected because it can be confirmed in a manual way: FIG. 6 shows a graph of the mean repair times of troubles reported to locations H and R during these hours of the day. This graph confirms the poorer performance of the "hot spot" during the 7-12 AM period. Note that the apparently large differences in the period just after midnight are not identified by the regression as significant differences, owing to their relatively small sample sizes.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method, comprising:
    receiving a diagnostic data set comprising a plurality of observational values for a plurality of diagnostic variables corresponding to an investigated unit and a benchmark unit;
    determining a plurality of logistic regression coefficients based on the diagnostic data set, each logistic regression coefficient corresponding to at least one diagnostic variable of the plurality of diagnostic variables, wherein determining a plurality of logistic regression coefficients further comprises:
    separating the diagnostic data set into first and second diagnostic data sets depending on whether the plurality of observational values contained therein correspond to the investigated unit or to the benchmark unit respectively;
    deriving first and second mean value sets from the first and second diagnostic data sets respectively;
    determining a covariance matrix between the first and second diagnostic data sets;
    determining the plurality of logistic regression coefficients based on a product of an inverse of the covariance matrix and a difference between the first and second mean value sets;
    selecting a subset of most significant diagnostic variables from the plurality of diagnostic variables based on the plurality of logistic regression coefficients in reference to significance criteria, wherein the selecting a subset of most significant diagnostic variables further comprises deriving a plurality of test statistic values comprising t-values and p-values; and
    generating at least one interaction variable as a cross product between elements of the subset of most significant diagnostic variables.

2. The method of claim 1, further comprising:
    generating at least one interaction variable between elements of the subset of most significant diagnostic variables.

3. The method of claim 2, wherein the interaction variable is generated as a cross product of elements of the subset of most significant diagnostic variables.

4. The method of claim 1, further comprising:
    extracting the plurality of diagnostic variables from a superset of diagnostic variables based on a decision tree analysis.

5. The method of claim 4, wherein the decision tree analysis is only performed when the number of elements of the superset of diagnostic variables exceeds a threshold.

6. The method of claim 1, wherein the selecting a subset of most significant diagnostic variables further comprises:
    deriving a plurality of test statistic values corresponding to each of the plurality of logistic regression coefficients; and
    wherein the selecting a subset of most significant diagnostic variables is based on the plurality of test statistic values in reference to the significance criteria.

7. The method of claim 6, wherein the significance criteria is based on an inspection of relative magnitudes of the plurality of test statistic values.

8. The method of claim 6, wherein the significance criteria is based on comparison of each of the plurality of test statistic values to a threshold level.

9. The method of claim 6, wherein the significance criteria is based on comparison of each t-value with corresponding values in a look-up table.

10. The method of claim 6, wherein a particular diagnostic variable is selected as a most significant diagnostic variable if a corresponding p-value is less than 5%.

11. The method of claim 1, further comprising:
identifying the investigated unit as an aberrant unit based on observed values for the most significant diagnostic variables.

12. The method of claim 11, wherein identifying the investigated unit is based on a probability determined from the observed values for the most significant diagnostic variables.

13. The method of claim 1, further comprising:
trimming outliers in the covariance matrix; and
transforming the covariance matrix to near symmetry.

14. The method of claim 1, wherein the determining a plurality of logistic regression coefficients further comprises:
creating a target variable whose value is one if a data point is associated with the investigated unit and zero otherwise; and
submitting the diagnostic data set to a logistic regression component of a data mining module, with the target variable designated as a dependent variable.

15. The method of claim 1, wherein the plurality of diagnostic variables include at least a repair time, a repair type, a repair location, and a time of day.

16. A method, comprising:
receiving a diagnostic data set comprising a plurality of observational values for a plurality of diagnostic variables corresponding to an investigated unit and a benchmark unit;
separating the diagnostic data set into first and second diagnostic data sets depending on whether the plurality of observational values contained therein corresponds to the investigated unit or to the benchmark unit respectively;
deriving first and second mean value sets from the first and second diagnostic data sets respectively;
determining a covariance between the first and second diagnostic data sets; determining a plurality of logistic regression coefficients based on a product of an inverse of the covariance matrix and a difference between the first and second mean value sets;
deriving a plurality of t-values values corresponding to each of the plurality of logistic regression coefficients;
selecting a subset of most significant diagnostic variables from the plurality of diagnostic variables based on the plurality of t-values in reference to significance criteria, wherein the selecting a subset of most significant diagnostic variables further comprises deriving a plurality of test statistic values comprising the t-values and p-values; and
generating at least one interaction variable as a cross product between elements of the subset of most significant diagnostic variables.

17. A computer program product, stored on a computer readable storage medium, comprising:
processor readable instructions stored in the computer program product, wherein the processor readable instructions are issuable by a processor to:
receive a diagnostic data set comprising a plurality of observational values for a plurality of diagnostic variables corresponding to an investigated unit and a benchmark unit;
determine a plurality of logistic regression coefficients based on the diagnostic data set, each logistic regression coefficient corresponding to at least one diagnostic variable of the plurality of diagnostic variables, wherein determining a plurality of logistic regression coefficients further comprises:
separating the diagnostic data set into first and second diagnostic data sets depending on whether the plurality of observational values contained therein correspond to the investigated unit or to the benchmark unit respectively;
deriving first and second mean value sets from the first and second diagnostic data sets respectively;
determining a covariance matrix between the first and second diagnostic data sets;
determining the plurality of logistic regression coefficients based on a product of an inverse of the covariance matrix and a difference between the first and second mean value sets;
select a subset of most significant diagnostic variables from the plurality of diagnostic variables based on the plurality of logistic regression coefficients in reference to significance criteria, wherein the selecting a subset of most significant diagnostic variables further comprises deriving a plurality of test statistic values comprising t-values and p-values; and
generating at least one interaction variable as a cross product between elements of the subset of most significant diagnostic variables.

* * * * *